United States Patent [19]
Birkwald et al.

[11] Patent Number: 6,022,069
[45] Date of Patent: Feb. 8, 2000

[54] AUTOMOBILE BODY PORTION AND FRAME ASSEMBLY

[75] Inventors: Oliver Birkwald, Sindelfingen; Hermann Kömpf, Calw-Stammheim, both of Germany

[73] Assignee: DaimlerChrysler AG, Stuttgart, Germany

[21] Appl. No.: 09/333,211

[22] Filed: Jun. 15, 1999

[30] Foreign Application Priority Data

Feb. 24, 1998 [DE] Germany .................. 198 07 747

[51] Int. Cl.⁷ ..................................... B60R 27/00
[52] U.S. Cl. .................. 296/204; 296/203.04; 296/195
[58] Field of Search .......................... 296/29, 30, 195, 296/203.04, 204

[56] References Cited

U.S. PATENT DOCUMENTS

| | | |
|---|---|---|
| 1,842,214 | 1/1932 | Sullivan . |
| 5,549,352 | 8/1996 | Janotik et al. . |
| 5,829,824 | 11/1998 | Yamamuro et al. .......... 296/204 |

FOREIGN PATENT DOCUMENTS

| | | |
|---|---|---|
| WO 80/02268 | 10/1980 | European Pat. Off. . |
| 44 31 970 | 3/1996 | Germany . |
| 196 18 258 | 11/1997 | Germany . |
| 506 966 | 6/1939 | United Kingdom . |
| 1 211 433 | 11/1970 | United Kingdom . |

*Primary Examiner*—Gary C. Hoge
*Assistant Examiner*—Mickki D. Murray
*Attorney, Agent, or Firm*—Klaus J. Bach

[57] ABSTRACT

In a body portion and frame assembly of a motor vehicle including a component assembly consisting of two longitudinally extending U-shaped profile members with outwardly directed spaced legs interconnected by transverse bottom and end panels which are welded to the U-shaped profile members, longitudinal frame members of the vehicle extend through the spaces between the spaced legs and are position-adjustable therein before they are welded to the legs of the U-shaped profile members thereby forming the body portion and frame member assembly with the frame members being accurately spaced from each other independently of tolerance deviations imparted by the transverse panels attached to the profile members.

3 Claims, 1 Drawing Sheet

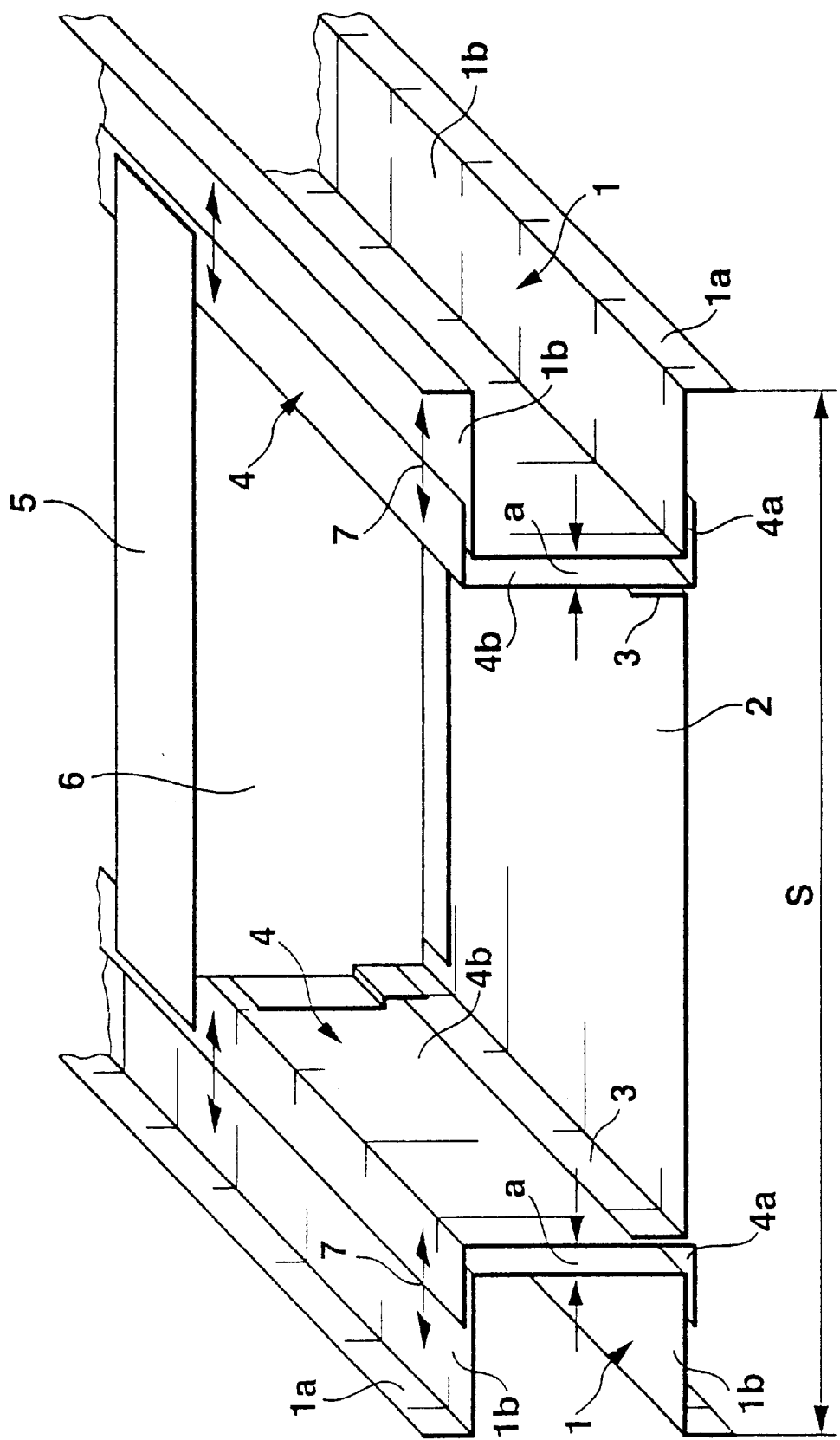

AUTOMOBILE BODY PORTION AND FRAME ASSEMBLY

BACKGROUND OF THE INVENTION

The invention relates to a body frame section of an automobile including two parallel U-shaped frame members arranged with their open sides facing in opposite directions and transversely extending sheet metal parts, particularly floor panels, and/or transverse walls which are welded to the frame sections and additional U-shaped members connected to the U-shaped frame sections to form, therewith a stiff hollow profile structure.

Such body or frame sections are used in motor vehicles at various locations. It is for example known to form the rear floor section of passenger cars by U-shaped longitudinal frame members into which additional U-shaped structures are incorporated for stiffening the frame and welding the floor and transverse wall parts directly to the web of the U-shaped longitudinal frame members.

Such an arrangement however causes problems when a certain distance is to be maintained between longitudinal frame members since the floor and transverse wall parts, which have to be welded in place between the frame members do not permit an accurate setting because of their tolerance deviations. The accurate manufacture of such body sections is therefore generally quite complicated and expensive.

It has been proposed in the construction of motor vehicles portions for example for the attachment of the front wall for a projecting structure to provide side wall halves adjacent the front wall with surfaces which abut the front wall in a vertical plane so that they can be moved relative to each other to permit proper positioning of the panels relative to each other before they are so interconnected. In this way, tensions can be avoided (Assignees' German Application 197 38 510.9, which was not published at the time of filing of the present application). However, in that case, the problem of the installation of components between two parallel beams, which must be disposed in parallel alignment and at a predetermined distance from each other, does not exist.

It is the object of the present invention to provide a motor vehicle body section including two parallel frame members in such or way that it can be manufactured easily with the frame members disposed accurately at a predetermined distance from each other.

SUMMARY OF THE INVENTION

In a body portion and frame assembly of a motor vehicle, a profile member assembly consisting of two longitudinally extending U-shaped profile members with outwardly directed spaced legs, the profile members are interconnected by transverse bottom and end panels which are welded to the U-shaped profile members. Longitudinal frame members of the vehicle extend through the spaces between the spaced legs and are position-adjustable therein before they are welded to the legs of the U-shaped profile members thereby forming the body portion and frame member assembly. The frame members are accurately spaced from each other independently of tolerance deviations imparted by the transverse panels attached to the profile members.

In this way, the outer frame member can be properly positioned since relative movement between the profile members interconnected by the transverse sheet metal panels and the frame members is possible before they are welded together. The desired stiffening of the outer frame members and of the whole structure however is still achieved. The legs of the U-profile members may form slide support flanges so that manufacturing tolerances can be easily accommodated without additional components. The components welded together to a building block do not need to be separated for corrective measures. Even distortions caused by the welding of the building block can be accommodated. The arrangement has the advantage that fewer adjustments and fewer tooling changes have to be made for the adjoining components, also for adjacent component blocks which, so far, had to be fitted to each other. As a result, manufacturing is greatly facilitated and manufacturing accuracies are improved as well.

In a particular embodiment of the invention, the building block is the rear end section of a vehicle floor structure, which is inserted between the longitudinal frame members.

The invention will become more readily apparent from the following description thereof on the basis of the accompanying schematic drawing.

BRIEF DESCRIPTION OF THE DRAWINGS

The sole figure shows schematically the installation of a pre-assembled rear end section of a vehicle floor structure between longitudinal frame members.

DESCRIPTION OF A PREFERRED EMBODIMENT

As shown in the figure, the vehicle longitudinal frame members 1 are U-shaped with their open sides directed outwardly in opposite direction. The outer end portions 1a of the two longitudinal frame member 1 should be at a predetermined distance S from each other so as to fit accurately to other vehicle body parts.

For this purpose, a bottom panel 2 with upstanding flange edges 3 at opposite ends of the bottom panel 2 is welded together with U-shaped profile members 4. They form with the bottom panel 2, a transverse panel 5 and an end panel 6, a drawer-like building block which is inserted between the two longitudinal frame members 1 and is welded to them. The two U-shaped profile members 4 have dimensions adapted to the dimensions of the longitudinal frame members 1. The two legs 4a extending from the web of the U-shaped profile members 4 form slide flanges receiving the legs 1b of the longitudinal frame members 1 and permitting a certain dimensional adjustment in the direction of the arrows 7. As a result, the longitudinal frame members 1 can be positioned such that their distance S is adjusted to the desired value. This allows for example the bottom part 2, transverse panel 5 and the end panel 6 to have tolerance dimensions which affect the positions of the U-shaped profile members with which they are connected. As apparent from the figure, the U-shaped profile members 4 are held in such a position that their webs 4b are disposed at a certain distance a from the webs of the longitudinal frame members 1, which webs interconnect the legs 1b. This provides for the desired stiffening of the longitudinal frame members 1, as together they form a hollow profile structure. The varying dimensions of the drawer-like building block can easily be accommodated.

Inspite of the fact that the invention has been explained with regard to a rear end vehicle body section, the concept may be employed of course for other parts of a vehicle body, for example, for the insertion of a reinforcement frame unit providing support for the engine of a motor vehicle.

What is claimed is:

1. A body portion and frame assembly in a motor vehicle, comprising: two longitudinally extending profile member having outwardly directed spaced legs so as to form between said legs outwardly open channels, said profile members having a transverse panel, a bottom panel, and an end panel disposed between said profile members and being welded thereto so as to form a component assembly holding said profile members at a distance as given by the transverse, bottom and end panels, and U-shaped longitudinal frame members extending along said profile members and being sized to fit between the outwardly directed legs of said profile members so as to be slidably received therebetween to permit accurate adjustment of the distance between said longitudinal frame members, said longitudinal frame members and said profile members being welded together to form said body portion and frame member assembly with said frame members being accurately spaced from each other independently of the tolerance deviations imported by said component assembly.

2. A body, portion and frame assembly according to claim 1, wherein the legs of said U-shaped profile members are slide flanges snugly engaging said longitudinal frame members but permitting relative movement therebetween, said component assembly having a width so selected that a gap remains between web portions of said U-shaped profile members and said frame member after they are welded together so as to form a high strength body portion and frame assembly.

3. A body portion and frame assembly according to claim 1, wherein said component assembly forms a floor wall assembly for the rear part of a vehicle and is disposed between, and welded to, the longitudinal frame members of the vehicle.

* * * * *